UNITED STATES PATENT OFFICE.

EDWARD A. DUNCAN, OF WASHINGTON, DISTRICT OF COLUMBIA, ASSIGNOR OF ONE-HALF HIS RIGHT TO JOHN HAILEY, OF BOISE CITY, IDAHO TER.

IMPROVEMENT IN PRESERVING MEAT.

Specification forming part of Letters Patent No. 162,539, dated April 27, 1875; application filed February 16, 1875.

*To all whom it may concern:*

Be it known that I, EDWARD A. DUNCAN, of Washington, District of Columbia, have invented an Improved Process of Preparing Meat or Flesh for Food, of which the following is a specification:

This invention relates to that class of processes employed for preparing flesh for food, as will hereinafter more fully appear, in such a manner as to enable it to resist the ordinary forces and influences that tend to decomposition and deterioration; and it consists in the various steps as hereinafter specified and claimed.

In carrying out my invention, the meat or flesh is first cut up into pieces of about a pound each. It is then placed in a hot-water bath, in exactly the same manner as glue in a glue-pot, and is allowed to cook in its own juice until tender, during which times sufficient quantities of nitrate of potash (saltpeter) and chloride of sodium (common salt) are added, for the purpose of imparting their preservative, antiseptic, and condimental properties, after which the mass is ground into a fine pulp and kiln-dried in a current of warm air until all moisture is extracted. When thoroughly dried, the pulp, as aforesaid, is pressed into suitable molds by heavy pressure, until it becomes a solid, compact, and consistent body. The size of these molds may be such as to contain a sufficient amount for a definite number of rations, which would be of obvious utility and convenience, in case my preparation was to be dealt out in that manner. I do not propose to employ cans or cases for enveloping my preparation, as it is only necessary to keep the same free from actual exposure to dampness and moisture; and for this purpose a wrapping of lead or tin foil, or any substance of the like character, would be amply sufficient.

In using my preparation, it may be eaten, as in the cake, without further cooking, if desired, as it is quite palatable in that state, or a soup or broth may be made by dissolving a sufficient amount of my preparation in water, milk, or any proper liquid.

I am aware that meats have heretofore been treated for the purpose of rendering them capable of resisting decomposition, and to be convenient for transportation in army and naval use and the like; but from all previous processes of which I am aware mine differs, both in the process of its preparation, as herein described, and in the product obtained from said process.

What I claim as my invention is—

The process of preparing flesh or meat by first separating it into pieces of a pound each, more or less, then treating with a hot-water bath, as glue, and incorporating into the mass nitrate of potash and chloride of sodium, then grinding the mass into a fine pulp, and after thoroughly drying said pulp, pressing the same into suitable molds, substantially as and for the purpose described.

In testimony that I claim the foregoing to be my invention, I have hereunto set my hand this 4th day of February, 1875.

EDWARD A. DUNCAN.

Witnesses:
    ROBT. M. BARR,
    ACLAND BOYLE.